A. KIMBLE.
VENTILATED PULLEY.
APPLICATION FILED APR. 25, 1921.

1,388,865.

Patented Aug. 30, 1921.

Witnesses:

Inventor:
Austin Kimble
By Rummler & Rummler, Attys.

UNITED STATES PATENT OFFICE.

AUSTIN KIMBLE, OF WAUSAU, WISCONSIN, ASSIGNOR TO MARATHON ELECTRIC MFG. CO., OF WAUSAU, WISCONSIN, A CORPORATION OF WISCONSIN.

VENTILATED PULLEY.

1,388,865.  Specification of Letters Patent.  Patented Aug. 30, 1921.

Application filed April 25, 1921. Serial No. 464,124.

*To all whom it may concern:*

Be it known that I, AUSTIN KIMBLE, a citizen of the United States of America, and a resident of Wausau, county of Marathon, and State of Wisconsin, have invented certain new and useful Improvements in Ventilated Pulleys, of which the following is a specification.

This invention relates primarily to air-cooled and artificially ventilated power transmission pulleys, and indirectly to speed regulation of belted motor-driven devices and means to manually adjust regulation of the speed of a driven device by means of variable belt tension, especially in connection with constant speed motors such for instance as alternating current motors of either synchronous or induction type.

The main objects of the invention are to provide an improved form of draft generating pulley adapted for self-ventilation and consequent cooling sufficient to avoid overheating when subjected to extensive belt slippage; to provide a high speed motor with such a pulley adapted to prevent accumulation and transmission of heat to and consequent overheating of the motor; to provide such a pulley in a form adapted to intimately relate the cooling draft both to the inner side and to the outer or belt-receiving face of the crown part; to provide for adjustable belt slippage with such a pulley whereby the speed of the driven machine may be varied relatively to the speed of a motor by means of varying the belt slippage with a belt tightener.

This invention is distinguished as to structure from the device of my Patent No. 1,372,700, of March 29, 1921, and from my two copending applications having the Serial Nos. 468933 and 464029, and the appended claims are limited to the present disclosure as distinct from said patent and other applications.

An illustrative embodiment of this invention is shown in the accompanying drawings, in which—

Figure 1:
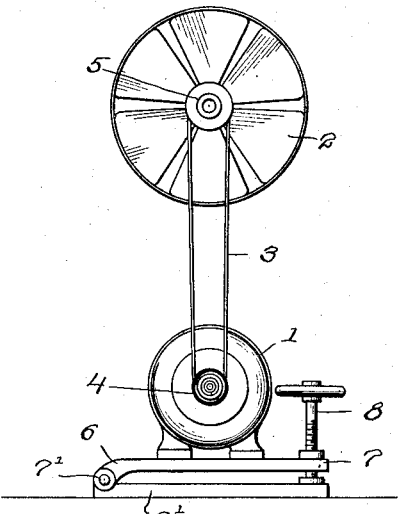
Figure 1 is a front elevation of a belt-connected motor and fan, with a manual belt tightener on the motor support.
Figure 2:
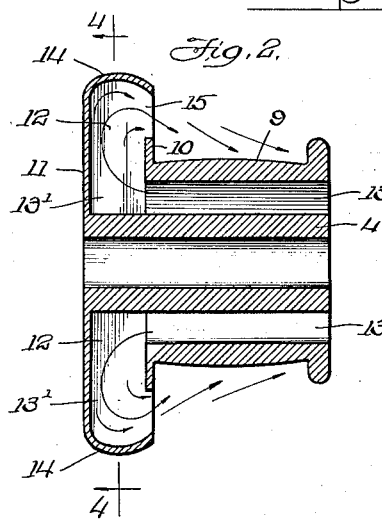
Fig. 2 is an axial section of the ventilated pulley on the line 2—2 of Fig. 3.
Figure 3:
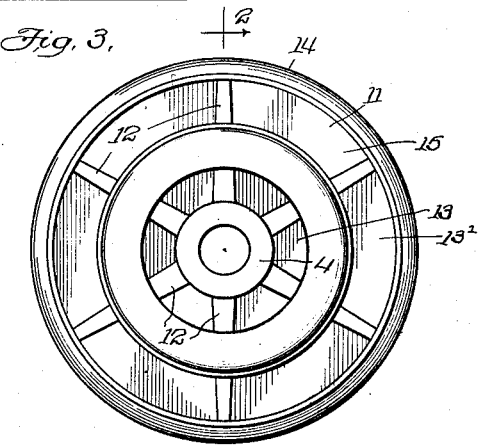
Fig. 3 is an end elevation of the draft intake end of the pulley.
Figure 4:
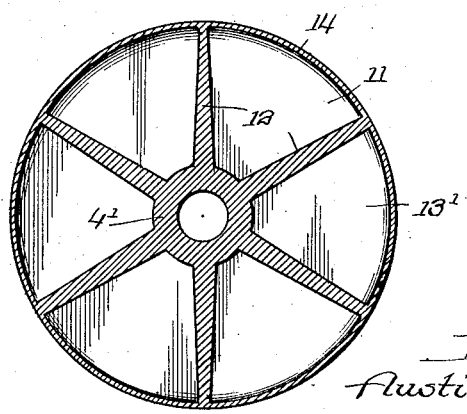
Fig. 4 is a section of the pulley on the line 4—4 of Fig. 2.

In the construction shown in the drawings, the motor 1 is operably connected to the fan 2 by means of the belt 3, said motor being provided with a pulley 4, and the fan being provided with a pulley 5 to receive said belt. The motor is mounted on an adjustable frame 6 comprising a stationary base part 6' and a movable part of platform 7 adapted and arranged for vertical movement by adjustable means 8 in the form of a screw and hand-wheel, said parts 6' and 7 being hinged together at one side as indicated at 7'. The driven pulley is so related to the motor pulley that movement of the screw 8 varies the tension of the belt, as will be understood.

It will be apparent that if the motor is adapted for constant speed and the driven device is in the form of a fan or other constant load mechanism, the tension of the belt may be adjusted to run the driven device at any constant speed desired less than its maximum speed, and heat will be generated by belt slip friction on the pulley crown. The self-ventilated draft generating pulley 4 comprises a hub 4', a crown rim 9 secured thereto as will be described, a radial flange 10 formed on the back side of rim 9, a radial flange 11 formed on the rear end of hub 4', and radial fan blades 12 disposed between said flanges 10 and 11. The blades 12 extend from the hub 4' to the outer edges of the flanges 10 and 11 and are cast integrally therewith and support the flange 10 and rim 9, the latter being in spaced relation to the hub 4' and concentric therewith to provide a central air intake draft passage 13. A plurality of draft passages 13' extend outwardly from the inner end of passage 13 between said flanges 10 and 11 and between said blades 12, whereby in operation a strong draft of air is drawn through the pulley and discharged radially past the blades 12.

The outer flange 11 extends past the inner flange 10 and its outer edge is curved over and inwardly, as at 14, so that its edge is about flush with the plane of flange 10 but spaced outwardly therefrom to provide a circular discharge aperture or nozzle 15 directed diagonally toward the crown 9. Hence, the air drawn in at 13 past the inner face of the rim is discharged backwardly against the outer face, thus cooling the pulley both interiorly and exteriorly by the same forced draft.

The operation of the pulley is apparent from the drawings, and the direction of the induced draft current is indicated by arrows.

The motor pulley is usually smaller than the driven pulley, and hence the slippage naturally occurs at the motor end of the belt, but in case the driven pulley is the smaller, the pulleys are made of such materials that slippage at the motor is assured, for which purpose the driven pulley may have the face of its rim formed of material offering greater surface friction than that of the motor pulley.

It is apparent that if the fan is adjusted for slow speed and correspondingly light load, the tension on the belt will be relatively small and consequently the bearing friction of the motor and fan will be correspondingly small, so that on light loads there is a saving of energy which would otherwise be lost through the bearings of a constantly tight-belted device.

Although but one specific embodiment of this invention has been herein shown and described, it will be understood that numerous details of the construction shown may be altered or omitted without departing from the spirit of this invention as defined by the following claims.

I claim:

1. A pulley having a radially disposed centrifugal fan part at one end arranged to admit air centrally and formed at its outer edge to deflect and discharge the air diagonally backward against the outer face of the pulley.

2. A self-ventilated pulley comprising a hollow rim and centrifugal fan means to induce a draft lengthwise over the inner surface thereof, said means being disposed radially at one end, and being formed to direct the air backwardly against the outer face of said rim.

3. A self-ventilated pulley having a hollow rim and means to induce a draft lengthwise thereof along its inner face, said means being of fan-like character and having a casing with an outwardly disposed discharge part facing diagonally inward across the exterior face to cool the rim.

4. A ventilated pulley comprising a hub and a rim with a draft passageway extending lengthwise between them, and draft inducing means at an end of the rim, adapted and arranged to urge a draft through said passageway, said means being in the form of a centrifugal fan having a guide frame to direct the radially urged air backwardly against said rim.

5. A pulley comprising a hub, a rim coaxial therewith and spaced therefrom, a pair of axially spaced flanges at one end, and a plurality of air propelling vanes disposed between and connecting said flanges, the chamber between the hub and rim being continuous with the chambers between the flanges at each end, and the outer edge of the outer flange being turned inwardly over the inner flange and radially spaced therefrom.

6. A pulley comprising a hub, a rim coaxial therewith and spaced therefrom, a pair of axially spaced flanges at one end, the outer overlapping the inner and turned inwardly, and a plurality of air propelling vanes disposed between and connecting said flanges, the inner flange terminating inwardly at the edge of the rim and the outer flange terminating at the hub, whereby a draft passageway is provided extending from one end of the pulley inwardly therethrough then outwardly, and finally facing diagonally back against the outer face of the rim.

Signed at Wausau this 20th day of April, 1921.

AUSTIN KIMBLE.